US011541589B2

(12) United States Patent
Hack et al.

(10) Patent No.: US 11,541,589 B2
(45) Date of Patent: Jan. 3, 2023

(54) APPARATUS AND METHOD FOR COUPLING AND UNCOUPLING MEDIA COUPLINGS ON THE BASE MOULD

(71) Applicant: KRONES AG, Neutraubling (DE)

(72) Inventors: Andreas Hack, Dingolfing (DE); Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/635,037

(22) PCT Filed: Aug. 2, 2018

(86) PCT No.: PCT/EP2018/071010
§ 371 (c)(1),
(2) Date: Jan. 29, 2020

(87) PCT Pub. No.: WO2019/025551
PCT Pub. Date: Feb. 7, 2019

(65) Prior Publication Data
US 2020/0238593 A1 Jul. 30, 2020

(30) Foreign Application Priority Data

Aug. 2, 2017 (DE) ..................... 10 2017 117 533.4
Aug. 2, 2017 (DE) ..................... 10 2017 117 576.8
(Continued)

(51) Int. Cl.
*B29C 49/36* (2006.01)
*B29C 49/42* (2006.01)
(Continued)

(52) U.S. Cl.
CPC .......... *B29C 49/4205* (2013.01); *B29C 49/06* (2013.01); *B29C 49/36* (2013.01);
(Continued)

(58) Field of Classification Search
CPC ........ B29C 49/4823; B29C 2049/4856; B29C 2049/4892; B29C 49/56; B29C 2049/4697
See application file for complete search history.

(56) References Cited

U.S. PATENT DOCUMENTS 5,255,889 A   10/1993  Collette et al.
7,037,099 B2   5/2006  Linke et al.
(Continued)

FOREIGN PATENT DOCUMENTS

DE   102009005142 A1 *  7/2010  ......... B29C 49/4823
DE   102009054385 A1 *  7/2011  ............. B29C 33/04
(Continued)

OTHER PUBLICATIONS

Partial machine translation of DE102009054385A1 dated Jul. 28, 2011 obtained from the espace website. (Year: 2011).*
(Continued)

*Primary Examiner* — Robert B Davis
(74) *Attorney, Agent, or Firm* — Onello & Mello, LLP

(57) ABSTRACT

Apparatus (1) for reshaping plastic preforms (10) into plastic containers (20) has a blow moulding device (14) which has at least two side parts (14a, 14b) and a base mould (14c) which form a hollow space inside which the plastic preforms (10) are reshaped into the plastic containers (20), wherein the apparatus has a changing device (40) which is suitable and intended either to remove the complete blow moulding device (14) or only parts (14a, 14b, 14c) of the blow moulding device (14) from the blow mould supports (16) thereof and/or to arrange them on the blow mould supports (16), wherein the base mould (14c) is arranged on a base mounting (19), and in a changing mode, through a lifting movement (H) and in particular a lifting and/or lowering of the base mounting (19), the base mould (14c) can be connected to the base mounting (19) or can be disconnected
(Continued)

Figure 1:
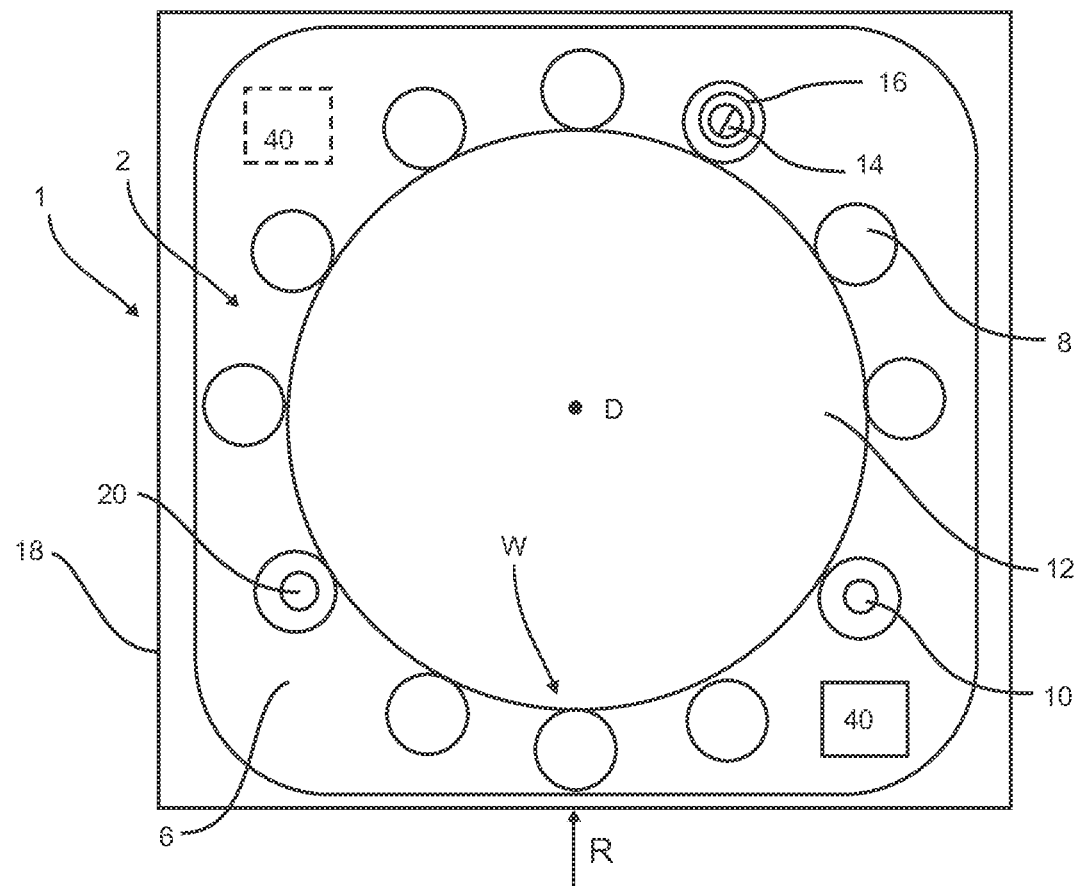

from the base mounting (19), and between the base mounting (19) and the base mould (14*c*) at least one first disconnectable media connection (21) is provided, by means of which a flowable medium can be supplied to the base mould (14*c*) and/or by means of which the flowable medium can be discharged from the base mould (14*c*). According to the invention the media connection (21) between the base mounting (19) and the base mould (14*c*) can also be made and/or can be broken by the lifting and/or lowering of the base mounting (19).

17 Claims, 2 Drawing Sheets

(30) Foreign Application Priority Data

| | | |
|---|---|---|
| Aug. 29, 2017 | (DE) | 10 2017 119 816.4 |
| Aug. 29, 2017 | (DE) | 10 2017 119 817.2 |
| Dec. 12, 2017 | (DE) | 10 2017 129 576.3 |

(51) Int. Cl.
*B29C 49/46* (2006.01)
*B29C 49/48* (2006.01)
*B29C 49/06* (2006.01)
*B29L 31/00* (2006.01)

(52) U.S. Cl.
CPC .......... *B29C 49/46* (2013.01); *B29C 49/4823* (2013.01); *B29C 49/48* (2013.01); *B29C 2049/4697* (2013.01); *B29C 2049/4838* (2013.01); *B29C 2049/4848* (2013.01); *B29C 2049/4856* (2013.01); *B29C 2049/4892* (2013.01); *B29L 2031/7158* (2013.01)

(56) References Cited

U.S. PATENT DOCUMENTS

| | | | |
|---|---|---|---|
| 7,789,655 B2 | 9/2010 | Klatt et al. | |
| 8,100,688 B2 | 1/2012 | Litzenberg et al. | |
| 8,292,612 B2 | 10/2012 | Langlois | |
| 8,408,893 B2 | 4/2013 | Stoiber et al. | |
| 8,550,803 B2 | 10/2013 | Senn | |
| 8,807,981 B2 | 8/2014 | Cirette et al. | |
| 8,915,729 B2 | 12/2014 | Zoppas et al. | |
| 9,296,147 B2 | 3/2016 | Le Pechour et al. | |
| 9,662,828 B2 * | 5/2017 | Hollriegl | B29C 49/786 |
| 9,873,222 B2 | 1/2018 | Blochmann | |
| 10,000,027 B2 | 6/2018 | Voth et al. | |
| 10,507,624 B2 | 12/2019 | Geltinger et al. | |
| 11,045,994 B2 | 6/2021 | Höellriegl | |
| 2004/0052892 A1 | 3/2004 | Linke et al. | |
| 2007/0292550 A1 | 12/2007 | Klatt et al. | |
| 2009/0178264 A1 * | 7/2009 | Stoiber | B29C 33/306 29/401.1 |
| 2010/0203185 A1 | 8/2010 | Litzenberg et al. | |
| 2011/0027409 A1 | 2/2011 | Stoiber et al. | |
| 2011/0049742 A1 | 3/2011 | Senn | |
| 2011/0133369 A1 * | 6/2011 | Martini | B29C 49/4205 264/523 |
| 2012/0052148 A1 | 3/2012 | Langlois | |
| 2013/0337099 A1 | 12/2013 | Cirette et al. | |
| 2014/0010910 A1 | 1/2014 | Zoppas et al. | |
| 2014/0065256 A1 | 3/2014 | Le Pechour et al. | |
| 2015/0145178 A1 | 5/2015 | Blochmann | |
| 2015/0145180 A1 * | 5/2015 | Finger | B29C 31/006 264/523 |
| 2015/0251366 A1 | 9/2015 | Voth et al. | |
| 2015/0306828 A1 * | 10/2015 | Geltinger | B29C 49/48 264/523 |
| 2018/0244005 A1 | 8/2018 | Geltinger et al. | |
| 2019/0111608 A1 | 4/2019 | Höellriegl | |

FOREIGN PATENT DOCUMENTS

| | | | | |
|---|---|---|---|---|
| DE | 102010006898 | | 8/2011 | |
| DE | 102014105762 | | 11/2015 | |
| DE | 102015117017 | | 4/2017 | |
| DE | 102015117292 | | 4/2017 | |
| EP | 2292405 | | 9/2011 | |
| EP | 2703146 | | 3/2014 | |
| EP | 2918391 | | 9/2015 | |
| EP | 2977179 A1 * | 1/2016 | ............ B29C 33/20 |
| WO | 2005025835 | | 3/2005 | |
| WO | 2008138293 | | 11/2008 | |
| WO | 2012119913 | | 9/2012 | |
| WO | WO-2017060047 A1 * | 4/2017 | ............ B29C 49/56 |
| WO | WO-2017153059 A1 * | 9/2017 | ............ B29C 49/48 |

OTHER PUBLICATIONS

Partial machine translation of Dachs et al (DE 102009005142 A1) dated Jul. 2010 obtained from the espace website. (Year: 2010).*
Google translation of WO 2017/153059 A1 dated Sep. 14, 2017. (Year: 2017).*
German Search Report dated Jul. 9, 2018 issued in corresponding German Application No. 102017119817.2.
International Search Report and Written Opinion dated Nov. 7, 2018 issued in corresponding International Application No. PCT/EP2018/071010.
Extended European Search Report dated Dec. 9, 2021 issued in corresponding European Application No. 21197945.5.
Third Party Appeal dated Jun. 28, 2022 issued in corresponding European Application No. 18750171.3.

* cited by examiner

APPARATUS AND METHOD FOR COUPLING AND UNCOUPLING MEDIA COUPLINGS ON THE BASE MOULD

The present invention relates to an apparatus and a method for reshaping plastic preforms into plastic containers. Such apparatuses and methods have been known for a long time from the prior art. In this case the plastic preforms are usually introduced into a blow mould which forms a cavity which gives the shaping for the plastic containers to be produced and inside which the plastic preforms are reshaped by application of a flowable medium, such as for example compressed air, and by stretching with a stretching rod to form the plastic containers.

In this case the blow mould usually consists of two side parts and a base mould, wherein moreover devices or so-called media couplings for feeding a further flowable medium, such as a temperature control medium for cooling and/or heating the blow mould or a sterilising medium for sterilising the blow mould, can also be present. If another container shape, size or type is to be produced, it is now necessary before a replacement of the blow mould devices also to release the media couplings arranged on the blow moulds and then again to connect to the new blow moulds. At the present time these media couplings are coupled and uncoupled manually by an operator.

However, this manual coupling or uncoupling of the media couplings gives rise to long setup times and as a result to long machine shutdown times. Moreover, it is also not ruled out that due to the intervention of the operator it is possible for faults to ensue, such as for example a wrongly or incorrectly or insufficiently firmly connected media coupling or also damage to the media coupling. Also, due to the procedure which is usual in the prior art, in the case of a change of blow mould an operator is always absolutely necessary.

The object of the present invention therefore is to provide a fully automatic changing process by which in particular the changing times for the blow moulding devices are considerably shortened by comparison with the prior art. These objects are achieved according to the invention by the subjects of the independent claims. Advantageous embodiments and modifications are the subject matter of the subordinate claims.

An apparatus according to the invention for reshaping plastic preforms into plastic containers has a blow moulding device which has at least two side parts and a base mould which form a hollow space inside which the plastic preforms can be reshaped into the plastic containers. Furthermore, the apparatus has a changing device which is suitable and intended to remove either the complete blow moulding device or only parts of the blow moulding device from the blow mould supports thereof and/or to arrange them on the blow mould supports, wherein the base mould is arranged on a base mounting, and in a changing mode, through a lifting movement and in particular a lifting and/or lowering of the base mounting, can be connected to the base mounting or can be disconnected from the base mounting, and between the base mounting and the base mould at least one first disconnectable media connection is provided, by means of which a flowable medium can be supplied to the base mould and/or by means of which the flowable medium can be discharged from the base mould.

According to the invention the media connection between the base mounting and the base mould can also be made and/or can be broken by the lifting and/or lowering of the base mounting.

Accordingly the invention relates to an automatic coupling and uncoupling of the media coupling on a base mould in a blow moulding station by lifting and lowering of the base or the base mounting, wherein this takes place preferably during an automatic change of blow mould, which is preferably carried out with the aid of a robot. In this case "automatic" is understood in particular to mean that the coupling and/or uncoupling of the media coupling or the making and/or breaking of the media connections takes place without intervention or without action by an operator.

Accordingly it is preferably proposed to automatically break and/or make a flow connection to the base mould. Thus during a change of blow mould the operator does not have to couple and uncouple the media couplings of the base mould individually one after the other, so that the setup time decreases.

Therefore in a preferred embodiment a mechanical connection between the base mounting and the base mould can also be made and/or can be broken by the lifting and/or lowering of the base mounting.

The changing device is preferably a changing robot. In this case the changing device can preferably be arranged stationary on the apparatus and can be a part of this apparatus. It would also be conceivable that the changing device is a mobile device which can be moved in its entirety and can be arranged on the apparatus if required. In order to enable a further saving of time, a plurality of changing devices can preferably also be provided, which perform a change of blow mould simultaneously on different reshaping stations.

Therefore, in a preferred embodiment the changing device is preferably a changing device which carries out an automatic or semi-automatic changing operation, and this changing to device is in particular a robot or a handling manipulator.

Also in the case of an automatic change of blow mould with a mould change robot system it is necessary to break the media connection to the base mould and to restore the connection with the newly replaced mould. Accordingly, a fully automatic change of blow mould is made possible by the invention, since also the media couplings can be automatically coupled and uncoupled, wherein a pneumatic manual quick change is possible without complex coupling and uncoupling of the media couplings.

The at least one changing device is preferably used in a changing mode in which at least one blow moulding device is changed, and which differs from an expansion mode, in which the plastic preforms are expanded to form plastic containers. Accordingly, the breaking and/or making of the media connections preferably takes place in a changing mode of the apparatus which differs from a normal mode of operation.

The apparatus for reshaping plastic preforms into plastic containers is preferably a reshaping station which has a plurality of blow moulding devices which are arranged on a common movable support. In this case this support is in particular a rotatable support. Advantageously a plurality of such blow moulding devices is arranged inside a blow moulding machine and particularly preferably inside a stretch blow moulding machine arranged. This means that the plastic preforms can be expanded by application of compressed air to the plastic containers. For this purpose the apparatus preferably has a blow moulding die which can be placed onto a mouth of the plastic preforms in order thus to apply blowing air to the plastic preforms or to expand them by means of blowing air. In addition, a valve assembly is preferably also provided, which controls the delivery of the blowing air to the plastic preforms. In this case it would also be possible that a liquid is used instead of the air.

In a further advantageous embodiment the reshaping stations each have stretching rods which expand the plastic preforms in the longitudinal direction thereof. Particularly preferably, the blow moulding machine or the supports and the blow moulding devices are arranged inside a clean room which demarcates the blow moulding machine relative to an unsterile environment. In this case, driving devices for the closing, locking and/or opening of the blow moulds are preferably located outside the clean room.

The blow moulding devices are preferably transported inside the clean room, wherein the clean room is preferably delimited by a plurality of walls. In this case the clean room delimited by at least one stationary wall and a wall which is movable relative to this stationary wall. In this case, for example, the support on which the blow moulds are arranged can already have or form one of these walls and in particular the moving wall. The clean room demarcates the blow moulds in particular from an unsterile environment.

In particular in this case the production or expansion (and also the filling) of the containers takes place inside a space with a low-contamination environment, which can be in particular a clean room. Advantageously the clean room surrounds the transport path of the containers at least partially, and preferably at least in the region in which the reshaping stations and/or the rotatable support are arranged, like a channel. Advantageously the changing device can likewise be arranged inside the clean room, particularly preferably not only in a changing mode but also in an expansion mode of the apparatus.

In a preferred embodiment the lifting movement of the base mounting is coupled to an opening and/or closing movement of the blow mould support. For changing of the blow mould devices, it is necessary first of all to open the blow mould support on which the blow moulding devices are arranged and to close it again after the insertion of a novel blow moulding device.

In a further preferred embodiment the lifting movement of the base mounting is controlled by means of a base lifting cam. Inside the blow moulding station or the reshaping station the pivoting movement during opening and closing of the two mould support halves is coupled to the lifting movement of the base by means of a base lifting cam and rollers on the mould support. Therefore with the apparatus according to the invention it is proposed that the lifting movement of the base coupled to the opening and closing of the mould support is also used even for breaking and/or making the media connection to the base mould.

In an advantageous embodiment at least one and preferably two plug nipples are arranged in a predetermined region of the blow mould on the underside of the base mould and at least one and preferably two counterpart pieces to these plug nipples are preferably arranged on the base mounting. Therefore the closure nipples on the base mould are not attached to the side of the base mould, as in the case of base moulds to be changed manually, but preferably downwardly directed plug nipples are present on the underside of the base mould. However, it would preferably also be conceivable that the aforementioned plug nipples are attached to the base mounting and correspondingly the counterpart pieces are attached to the base mould. Accordingly a plug connection is advantageously provided by the plug nipples and the counterpart pieces, in order to make and/or to break a media connection between the base mounting and the base mould.

The making and/or breaking of this media connection preferably takes place by a vertical movement of the base mounting.

Advantageously the apparatus can also have a valve which controls, and in a changing mode of the apparatus in particular interrupts or prevents, the supply and/or discharge of the flowable medium to/from the base mould.

In this case a latching of the base mould with the base mounting preferably also takes place automatically. Therefore in a preferred embodiment by means of an automatic clamping system the base mould can be latched to the base mounting and/or can be released from the base mounting.

If a blow mould is now to be inserted into the reshaping station, the blow mould support is preferably (automatically) opened and the base or the base mounting is moved downwards by means of the base lifting cam. The changing device or the robot then preferably inserts either a complete mould set, consisting of two side parts and the base mould, or only the base mould, into the reshaping station at the provided position. By (automatic) closing of the blow mould support the base mounting preferably travels upwards again by means of the base lifting cam and the plug nipples on the base mould are pressed, but preferably not engaged, in or on the counterpart pieces. The base mould is firmly latched to the base mounting by the automatic clamping system and thus is coupled permanently to the base mounting until releasing of this latching. Thus the plug nipples also remain pressed onto the counterpart piece and the media connection is produced. When the blow mould or base mould is removed from the reshaping station the automatic clamping system for latching the base mould is preferably released again and the base mounting moves downwards due to opening of the mould support and thus the plug nipples and counterpart pieces move apart. In this case the base mould or the complete blow mould is held by the changing device or by the changing robot. Thus the media connection to the base mould is uncoupled again.

In a further preferred embodiment, between the base mounting and the base mould at least one first media connection and a second media connection is provided and by the lifting and/or lowering of the base mounting both media connections between the base mounting and the base mould can be made and/or can be broken in particular simultaneously by the lifting and/or lowering of the base mounting. Accordingly the media connections are preferably arranged substantially at the same height level.

However, the media connections are preferably also arranged at height levels which are different from one another. In this case the height level is understood to be a plane which is horizontal by comparison with the base plane of the apparatus. Accordingly, the media connections can be produced and/or can be broken successively.

In a further preferred embodiment, each media connection has a channel by means of which the flowable medium can be supplied to the base mould and/or by means of which the flowable medium can be discharged from the base mould and the flowable medium can preferably be fed via the channel of the first media connection to the base mould and can be discharged from the base mould via the channel of the second media connection.

The flowable medium is preferably a temperature control medium for temperature control and preferably for cooling and/or heating of the base mould of the blow moulding device. The temperature control medium is preferably cool water and/or warm water. In this case, however, the flowable medium could also be a sterilisation or cleaning medium in liquid or in vapour form, which is fed to the blow moulding device and in particular to the base mould for sterilisation and/or cleaning of the blow moulding device.

Preferably in this case the base mould not only has such media connections but also one or both side parts. Therefore a media connection is preferably arranged in the base part and/or in a side part and/or in both side parts of the blow moulding device. A plurality of channels are preferably provided, so that the individual parts of the blow moulding device can be supplied individually with a flowable medium. This offers the advantage that for instance the individual parts can be temperature-controlled separately and independently of one another. Therefore it is conceivable for instance that at least one coolant channel and/or at one heating agent channel is provided, which serves for guiding a flowable coolant and/or heating agent for cooling and/or heating the blow moulding device and/or of the blow mould support device. Preferably at least one first fluid circuit is provided in order to control the temperature of the side wall and at least one further fluid circuit is provided in order to control the temperature of the base mould.

The apparatus can be designed in such a way that the base parts and the side parts of the blow moulding devices, preferably jointly and particularly preferably individually, can be supplied with flowable medium or temperature-controlled.

In a further advantageous embodiment the media connections present are configured so as to be self-sealing. This offers the advantage that it is not specifically necessary during production of the media connection or during the production of a flow connection to carry out sealing of the coupling device, which then advantageously contributes to a shorter setup time.

In a further advantageous embodiment of the changing device, the changing device has at least one gripping device for gripping the blow moulding device, wherein this gripping device is suitable for selectively changing the complete blow moulding device or only parts of the blow moulding device. The gripping device is preferably arranged in such a way that it is pivotable about a plurality of axes.

In a further advantageous embodiment the base mould can also be inserted and/or removed manually. In this case, for removal the operator preferably releases the automatic clamping system and the base mould can be simply removed and thus the media coupling can be released. For insertion of the base mould the operator preferably presses the base mould onto the provided position on the base mounting and latches the automatic clamping system. Due to the automatic clamping system the base mould is again drawn onto the base mounting, the plug nipple is pressed onto the counterpart piece and thus the media coupling is produced.

Furthermore, the present invention is also directed to a method for reshaping plastic preforms into plastic containers with a blow moulding device which has at least two side parts and a base mould which form a hollow space inside which the plastic preforms can be reshaped into the plastic containers, wherein a changing device is provided, which either removes the complete blow moulding device or only parts of the blow moulding device from the blow mould supports thereof and/or arranges it/them on the blow mould supports, wherein the base mould is arranged on a base mounting, and in a changing mode, through a lifting movement and in particular a lifting and/or lowering of the base mounting, the base mould is connected to the base mounting or is disconnected from the base mounting, and between the base mounting and the base mould at least one first disconnectable media connection is provided, by means of which a flowable medium is supplied to the base mould and/or by means of which the flowable medium is discharged from the base mould.

According to the invention the media connection between the base mounting and the base mould is also made and/or broken by the lifting and/or lowering of the base mounting.

Accordingly, it is also proposed by the method that during a change of blow mould, without action by an operator, ae media connection is also automatically disconnected and/or produced on the base mould.

In this case a changing mode is understood to be a mode different from the mode of operation in which preferably no reshaping of the plastic preforms into plastic containers is carried out.

The changing device is preferably a changing robot by which the blow moulding devices or parts of the blow moulding device to be replaced are gripped by means of a gripping device and removed from the apparatus and a new blow moulding device or parts of the blow moulding device are introduced into the apparatus.

In a particularly preferred embodiment, upon opening of the blow mould support the base mounting is lowered and/or upon closing of the blow mould support the base mounting is raised.

In a further preferred embodiment, between the base mounting and the base mould at least one first media connection and one second media connection is provided and by the lifting and/or lowering of the base mounting both media connections between the base mounting and the base mould can be made and/or can be broken simultaneously by the lifting and/or lowering of the base mounting.

Further advantages and embodiments are apparent from the appended drawings.

Figure 2:
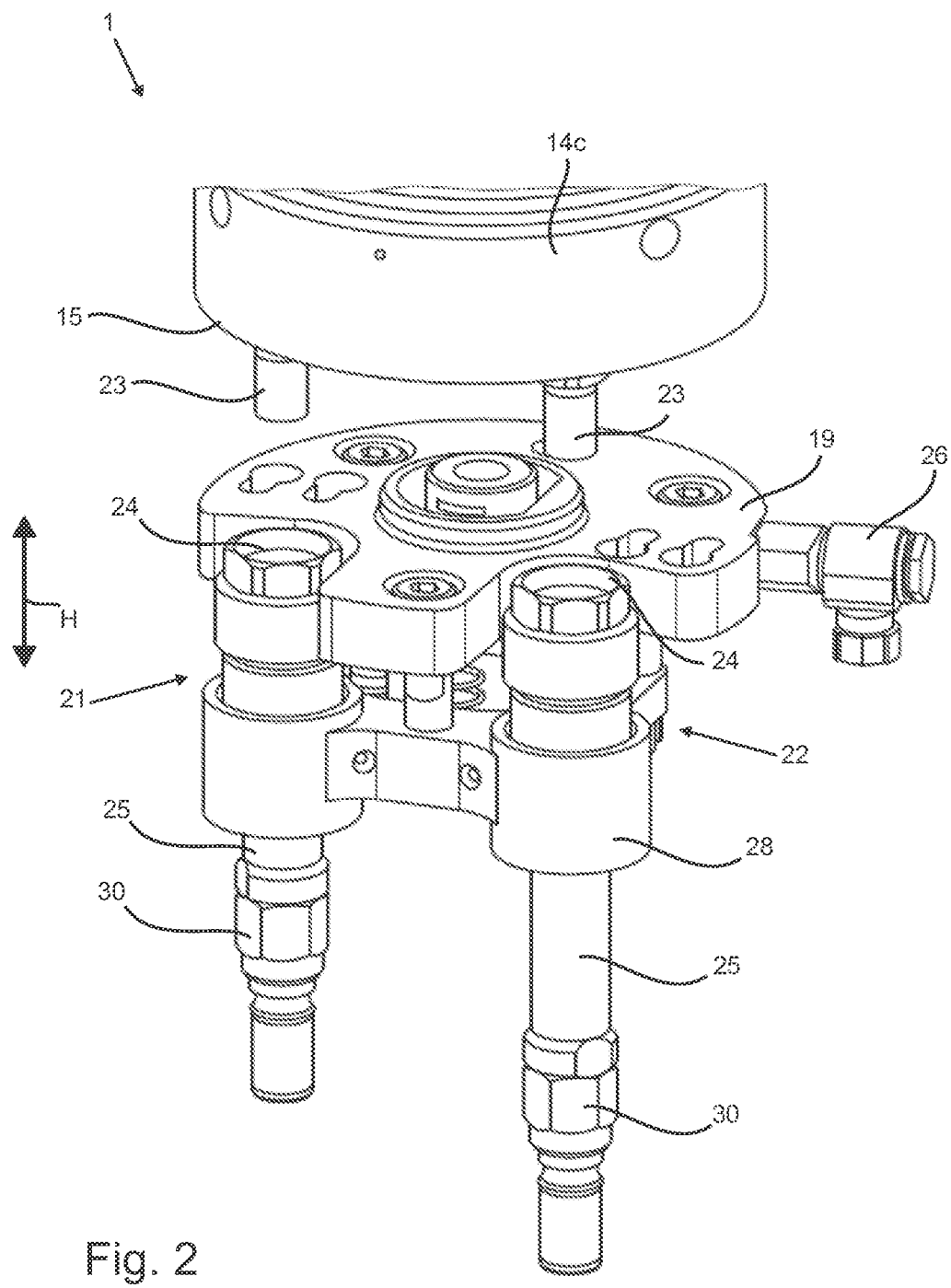

In the drawings:

FIG. 1 shows a schematic representation of an apparatus for reshaping plastic preforms into plastic containers; and FIG. 2 shows a schematic representation of an apparatus for reshaping plastic preforms into plastic containers.

FIG. 1 shows a schematic representation of an apparatus 1 for reshaping plastic preforms 10 into plastic containers 20. In this case the plastic preforms 10 are fed to the individual reshaping stations 8 and are expanded to form plastic containers 20, preferably while they are being transported by a transport device 2. After this expansion the plastic containers 20 are removed from the apparatus 1 again. For this purpose, a feed starwheel (not shown) can be provided which delivers the plastic parisons to the apparatus 1 and also a discharge device (also not shown), in particular likewise a transport starwheel, which discharges the finished containers 20 from the apparatus. The apparatus 1 has a station support 12 on which a plurality of reshaping stations 8 are arranged. In this case this station support may be for example, as shown in FIG. 1, a blow moulding wheel which is rotatable with respect to an axis of rotation D (which here extends perpendicular to the drawing plane and thus vertically). Each individual reshaping station has a respective blow moulding device 14. This blow moulding device 14 is composed of two side parts and a base part. These blow moulding devices can be replaced according to the invention. In this case the blow mould devices 14 are arranged on blow mould supports 16 and can be removed therefrom or arranged thereon.

The reference 40 identifies a changing device which serves to remove the blow mould devices from their blow mould supports or to dispose the blow mould devices on the blow mould supports. The reference 6 identifies a base support on which the station support 12 is rotatably mounted. The changing device 40 is also arranged on or adjacent to the base support 6. Thus the changing device 40 can be integrated in the apparatus. The reference sign 18 identifies a housing, which at least partially surrounds the station support 12, but which can preferably also enclose or house the changeover device 40. The housing preferably disconnects its interior, which is designed as a sterile room or a clean room, from a normal atmosphere. In this case the changing device 40 represented by a broken line (in the left corner of the apparatus) should make it clear that the changing device 40 can also be arranged at various positions of the apparatus 1 can or also more than one changing device 40 can be present on the apparatus 1.

The reference W designates a changing position of the apparatus 1. The blow moulding devices are preferably replaced at a specific changing position. This means that the transforming stations can be moved successively into this changing position W by a rotation of the support 12 and then in this changing position the old blow moulding devices can be removed and preferably also new blow moulding devices can be delivered. The reference R designates a radial direction. In this radial direction the changing device or a gripping device of the changing device is preferably delivered to the transforming stations or the blow mould devices in order to change them.

FIG. 2 shows a schematic view of a detail of an apparatus 1 for reshaping plastic preforms into plastic containers, wherein here in particular the base mould 14c and the base mounting 19 are illustrated in a lowered position of the base mounting 19. In this case the reference H designates the lifting movement of the base mounting 19. In this case on an underside 15 of the base mould 14c are arranged two plug nipples 23, which fit into counterpart pieces 24 arranged on the base mounting 19 and, in a state in which the base mould 14c and the base mounting 19 are connected to one another or latched to one another, these plug nipples make a firm connection produce and thus facilitate a supply and/or discharge of a flowable medium by means of a first and a second 21, 22 media connection.

The first and the second media connection 21, 22 preferably in each case have a channel 25, by means of which the flowable medium can be fed and/or discharged, wherein in particular a coupling device 30 can also be provided, by means of which the media connection 21, 22 can preferably be manually broken and/or made. The reference 26 preferably designates a further connector, by means of which likewise a flowable medium, such as for example compressed air, a temperature control medium, a sterilising medium, a cleaning medium or the like can be fed in and/or discharged. Furthermore, can a holder 28 for the media connections 21 and 22 can be provided on the base mounting 19.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 apparatus
2 transport device
6 base support
8 reshaping station
10 plastic preform
12 station support
14 blow moulding device
14a, 14b side parts
14c base mould
15 underside of the base mould 14c
16 blow mould support
18 housing
19 base mounting
20 plastic container
21 first media connection
22 second media connection
23 plug nipple
24 counterpart piece
25 channel
26 connection
28 holder
30 coupling device
40 changing device
H lifting movement
D axis of rotation
R radial direction
W change position

The invention claimed is:

1. Apparatus for reshaping plastic preforms into plastic containers has a blow moulding device which has at least two side parts and a base mould which form a hollow space inside which the plastic preforms are reshaped into the plastic containers, wherein the apparatus has a changing device which is suitable and intended either to remove the complete blow moulding device or only parts of the blow moulding device from blow mould supports thereof and/or to arrange them on the blow mould supports, wherein the base mould is arranged on a base mounting, and in a changing mode, through a lifting and/or lowering of the base mounting, the base mould can be connected to the base mounting or can be disconnected from the base mounting, and between the base mounting and the base mould at least one first disconnectable media connection is provided, by means of which a flowable medium can be supplied to the base mould and/or by means of which the flowable medium can be discharged from the base mould, characterised in that the at least one first disconnectable media connection between the base mounting and the base mould can also be made and/or can be broken by the lifting and/or lowering of the base mounting, and wherein the lifting movement of the base mounting is coupled to an opening and/or closing movement of the blow mould supports, and wherein inside a reshaping station a pivoting movement during opening and closing of the at least two side parts is coupled to the lifting movement of the base mould by means of a base lifting cam and rollers on a mould support on which the blow moulding devices are arranged, and wherein two downwardly directed plug nipples protruding from the base mould are arranged on an underside of the base mould and two counterpart pieces to the plug nipples are arranged on the base mounting, wherein a plug connection is provided by the plug nipples and the counterpart pieces, in order to make and/or to break a media connection between the base mounting and the base mould, wherein the making and/or breaking of this media connection takes place by a vertical movement of the base mounting.

2. Apparatus according to claim 1, characterised in that a mechanical connection between the base mounting and the base mould can also be made and/or can be broken by the lifting and/or lowering of the base mounting.

3. Apparatus according to claim 1, characterised in that the changing device carries out an automatic or semi-automatic changing operation.

4. Apparatus according to claim 1, characterised in that the lifting movement of the base mounting is controlled by means of a base lifting cam.

5. Apparatus according to claim 1, characterised in that at least one plug nipple is arranged on the underside of the base mould and at least one counterpart piece to this plug nipple is arranged on the base mounting.

6. Apparatus according to claim 1, characterised in that by means of an automatic clamping system the base mould can be latched to the base mounting and/or can be released from the base mounting.

7. Apparatus according to claim 1, characterised in that between the base mounting and the base mould at least one first media connection and a second media connection is provided, and simultaneously both media between the base mounting and the base mould can be made and/or can be broken by the lifting and/or lowering of the base mounting.

8. Apparatus according to claim 5, characterised in that each media connection has a channel by means of which the flowable medium can be supplied to the base mould and/or by means of which the flowable medium can be discharged from the base mould and the flowable medium can preferably be fed via the channel of the first media connection to the base mould and can be discharged from the base mould via the channel of the second media connection.

9. Apparatus according to claim 1, characterised in that the changing device has at least one gripping device for gripping the blow moulding device, wherein this gripping device is suitable for selectively changing the complete blow moulding device or only parts of the blow moulding device.

10. Method for reshaping plastic preforms into plastic containers has a blow moulding device which has at least two side parts and a base mould which form a hollow space inside which the plastic preforms are reshaped into the plastic containers, wherein a changing device is provided which either removes the complete blow moulding device or only parts of the blow moulding device from the blow mould supports thereof and/or arranges them on the blow mould supports, wherein the base mould is arranged on a base mounting, and in a changing mode, a lifting and/or lowering of the base mounting, the base mould is connected to the base mounting or is disconnected from the base mounting, and between the base mounting and the base mould at least one first disconnectable media connection is provided, by means of which a flowable medium is supplied to the base mould and/or by means of which the flowable medium is discharged from the base mould, characterised in that the media connection between the base mounting and the base mould is also made and/or is broken by the lifting and/or lowering of the base mounting, and wherein the lifting movement of the base mounting is coupled to an opening and/or closing movement of the blow mould supports,
wherein inside a reshaping station a pivoting movement during opening and closing of the at least two side parts is coupled to the lifting movement of the base mould by means of a base lifting cam and rollers on a mould support on which the blow moulding devices are arranged, and
wherein two downwardly directed plug nipples protruding from the base mould are arranged on an underside of the base mould and two counterpart pieces to the plug nipples are arranged on the base mounting, wherein a plug connection is provided by the plug nipples and the counterpart pieces, in order to make and/or to break a media connection between the base mounting and the base mould, wherein the making and/or breaking of this media connection takes place by a vertical movement of the base mounting.

11. Method according to claim 10, characterised in that upon opening of the blow mould support the base mounting is lowered and/or upon closing of the blow mould support the base mounting is raised.

12. Method according to claim 10, characterised in that between the base mounting and the base mould at least one first media connection and a second media connection is provided, and simultaneously both media connections between the base mounting and the base mould are made and/or are broken by the lifting and/or lowering of the base mounting.

13. Apparatus according to claim 3, characterized in that the changing device is a robot or a handling manipulator.

14. Apparatus according to claim 3, characterized in that two plug nipples are arranged on the underside of the base mould and two counterpart pieces to the plug nipples are arranged on the base mounting.

15. Apparatus according to claim 1, characterized in that a clean room surrounds a transport path of the containers at least in the region in which the reshaping stations and/or a rotatable support are arranged, like a channel.

16. Apparatus according to claim 7, characterized in that the media connections are arranged at height levels which are different from one another, so that the media connections are produced and/or broken successively.

17. Apparatus for reshaping plastic preforms into plastic containers has a blow moulding device which has at least two side parts and a base mould which form a hollow space inside which the plastic preforms are reshaped into the plastic containers, wherein the apparatus has a changing device which is suitable and intended either to remove the complete blow moulding device or only parts of the blow moulding device from the blow mould supports thereof and/or to arrange them on the blow mould supports, wherein the base mould is arranged on a base mounting, and in a changing mode, through a lifting and/or lowering of the base mounting, the base mould can be connected to the base mounting or can be disconnected from the base mounting, and between the base mounting and the base mould at least one first disconnectable media connection is provided, by means of which a flowable medium can be supplied to the base mould and/or by means of which the flowable medium can be discharged from the base mould, characterised in that the media connection between the base mounting and the base mould can also be made and/or can be broken by the lifting and/or lowering of the base mounting, and wherein the lifting movement of the base mounting is coupled to an opening and/or closing movement of the blow mould supports the apparatus characterised in that between the base mounting and the base mould at least one first media connection and a second media connection is provided, and simultaneously both media between the base mounting and the base mould can be made and/or can be broken by the lifting and/or lowering of the base mounting, and further characterized in that the media connections are arranged at height levels which are different from one another, so that the media connections are produced and/or broken successively.

* * * * *